United States Patent
Lin

(10) Patent No.: US 8,717,155 B2
(45) Date of Patent: May 6, 2014

(54) BRAKE WARNING DEVICE AND METHOD

(75) Inventor: Hung-I Lin, Tu-Cheng (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 618 days.

(21) Appl. No.: 12/908,890

(22) Filed: Oct. 21, 2010

(65) Prior Publication Data

US 2012/0007727 A1    Jan. 12, 2012

(30) Foreign Application Priority Data

Jul. 8, 2010 (TW) .............................. 99122423 A

(51) Int. Cl.
*B60Q 1/44* (2006.01)
(52) U.S. Cl.
CPC *B60Q 1/44* (2013.01); *B60Q 1/444* (2013.01); *B60Q 1/441* (2013.01)
USPC ........... 340/432; 340/463; 340/466; 340/467; 340/468; 340/471; 340/479
(58) Field of Classification Search
None
See application file for complete search history.

(56) References Cited

U.S. PATENT DOCUMENTS

| 3,846,749 | A   | * | 11/1974 | Curry ............................ | 340/467 |
|-----------|-----|---|---------|-----------------------------------|---------|
| 7,221,263 | B2  | * | 5/2007  | Moore et al. ................... | 340/427 |
| 7,649,447 | B2  | * | 1/2010  | Lu .................................. | 340/467 |
| 8,441,347 | B2  | * | 5/2013  | Marlowe et al. ............... | 340/467 |
| 2002/0154008 | A1 | * | 10/2002 | Wu et al. ........................ | 340/467 |
| 2004/0008106 | A1 | * | 1/2004 | Konczal ........................ | 340/432 |
| 2006/0125617 | A1 | * | 6/2006 | Zimmermann ............... | 340/467 |
| 2007/0247296 | A1 | * | 10/2007 | Moore et al. ................... | 340/467 |
| 2009/0261963 | A1 | * | 10/2009 | Ault ............................... | 340/467 |

FOREIGN PATENT DOCUMENTS

CN          201287782 Y       8/2009

* cited by examiner

*Primary Examiner* — Julie Lieu
(74) *Attorney, Agent, or Firm* — Novak Druce Connolly Bove + Quigg LLP

(57) ABSTRACT

A brake warning device and method includes acquiring acceleration data of a bicycle, and calculating a specific parameter according to the acceleration data acquired within a preset interval using a preset calculation method. The bicycle is determined to be decelerating if the specific parameter is less than a preset threshold value. A brake light of the brake warning device is turned on to warn that the bicycle is braking.

15 Claims, 4 Drawing Sheets

BRAKE WARNING DEVICE AND METHOD

BACKGROUND

1. Technical Field

Embodiments of the present disclosure relate to control technology, and more particularly to a brake warning device and method.

2. Description of Related Art

Bicycles are good for the environment and healthy for people. However, most bicycles have no brake lights. If people are cycling on the road, it can be dangerous when the bicycle brakes suddenly. Cars behind the bicycle may collide with the bicycle. Thus, a method for avoiding traffic accidents is desired.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, Java, C, or Assembly, for example. One or more software instructions in the modules may be embedded in firmware, such as an erasable programmable read only memory (EPROM). It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage system.

Figure 1:
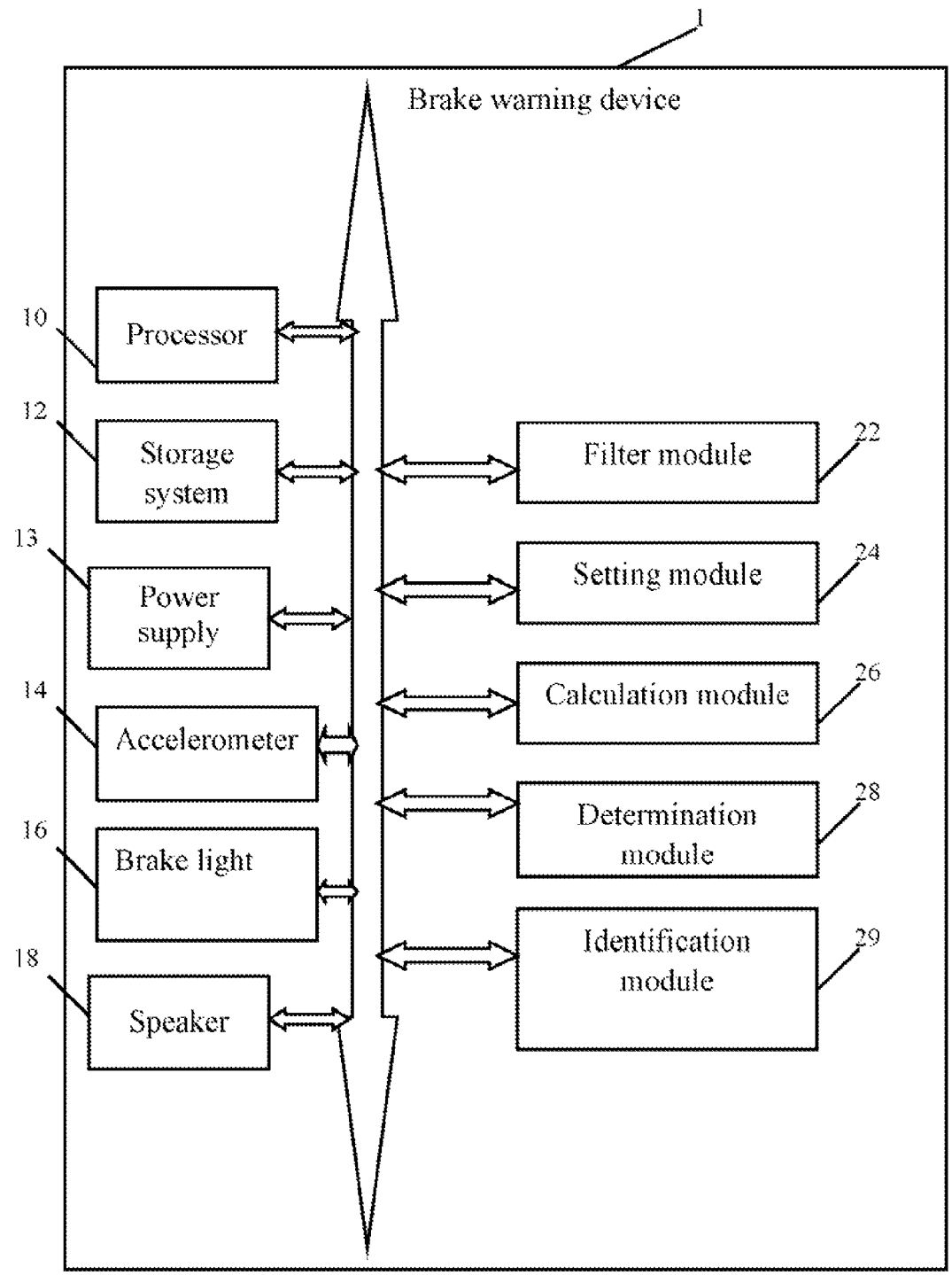
FIG. 1 is a block diagram of one embodiment of a brake warning device.

FIG. 1 is a block diagram of one embodiment of a brake warning device 1.

The brake warning device 1 may be fixed onto a bicycle, or can be positioned on the bicycle. In some embodiments, the brake warning device 1 may be used to determine if the bicycle is decelerating, and output warning signals if the bicycle is decelerating. Detailed descriptions are provided below.

The brake warning device 1 includes a power supply 13, an accelerometer 14, a brake light 16, and a speaker 18. The power supply 13 may supply power to the brake warning device 1. The power supply 13 may be batteries, for example. The accelerometer 14 may detect acceleration data of the bicycle. The accelerometer 14 may be a 3-axis accelerometer, for example. In some embodiments, the accelerometer 14 may be enabled under the condition that the brake warning device 1 is powered on. In other embodiments, the accelerometer 14 may be enabled or disabled according to user requirements.

In some embodiments, the brake warning device 1 may output warning signals through the brake light 16 and/or the speaker 18. The brake light 16 may include a light-emitting component, such as a light-emitting diode (LED). The brake light 16 may be turned on and/or the speaker 18 may output audio warning signals to warn people under the condition that the bicycle is decelerating.

The brake warning device 1 also includes a processor 10 and a storage system 12. The processor 10 executes one or more computerized operations of the brake warning device 1 and other applications, to provide functions of the brake warning device 1. The storage system 12 stores one or more programs, such as programs of the operating system, other applications of the brake warning device 1, and various kinds of data, such as preset data. In some embodiments, the storage system 12 may include a memory of the brake warning device 1 and/or an external storage card, such as a memory stick, a smart media card, a compact flash card, or any other type of memory card.

The brake warning device 1 further includes a filter module 22, a setting module 24, a calculation module 26, a determination module 28, and an identification module 29. The modules 22, 24, 26, 28 and 29 may include computerized codes in the form of one or more programs that are stored in the storage system 12. The computerized codes include instructions that are executed by the at least one processor 10 to provide functions for modules 20, 22, 24, 26, 28 and 29. Details of these functions will be provided below.

The accelerometer 14 is enabled to detect acceleration data of the bicycle under the condition that the brake warning device 1 is powered on. The accelerometer 14 may be preset to detect velocity rates of the bicycle changing over time, known as acceleration data. In one example, a predetermined number of the acceleration data may be collected. For example, acceleration data may be collected over a one minute interval.

The filter module 22 filters noise from the acceleration data. Generally, the acceleration data may include noise (e.g., white noise) because of the environment, magnetic fields, a quality of the accelerometer 14, or other factors. White noise is a random signal with a flat power spectral density. In other words, white noise contains equal power within a fixed frequency width at any center frequency.

In some embodiments, the filter module 22 may filter the noise using the fixed frequency width (e.g., 3 Hz). Thus, the noise having the fixed frequency width is filtered from the acceleration data. In other embodiments, the filter module 22 may filter the noise using a frequency range, for example [3*(1+3%) Hz, 3*(1-3%) Hz]. Thus, the noise within the frequency range is filtered. In addition, the filter module 22 may filter the noise using other methods, for example, a moving average (MA) model.

Figure 2:
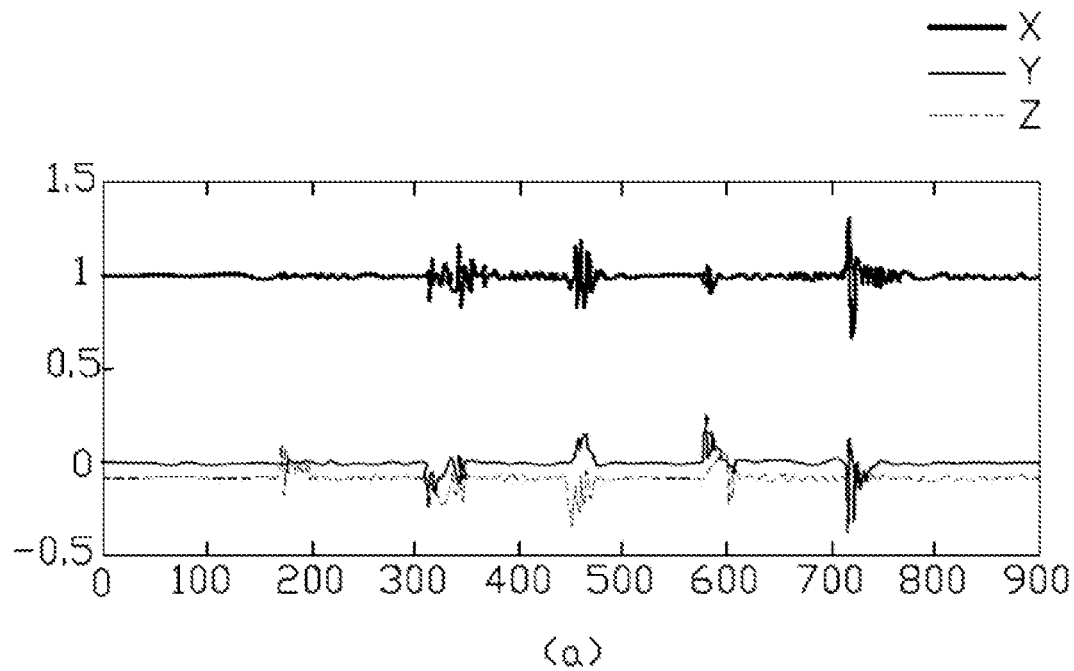
FIG. 2 is a schematic diagram of one embodiment of acceleration data acquired by the brake warning device of FIG. 1.
Figure 2:
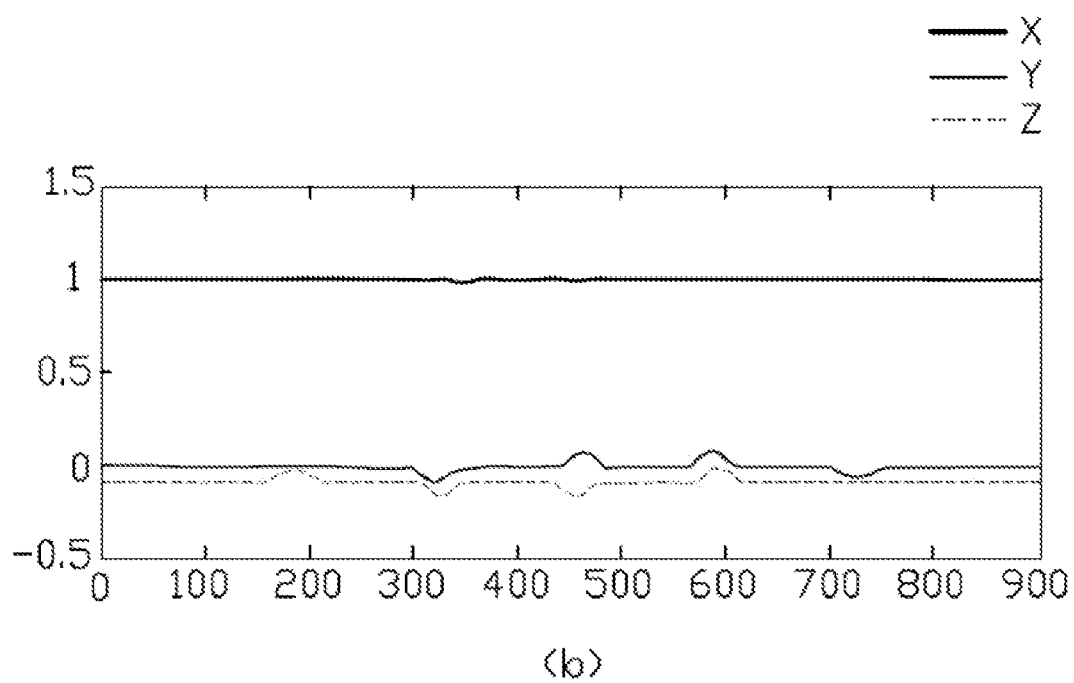

FIG. 2 provides image (a) and image (b) to show the contrast of the acceleration data. Image (a) shows the acceleration data before the noise has been filtered, and image (b) shows the acceleration data after the noise has been filtered. It is understood that the acceleration data may be more accurate after the noise is filtered.

The setting module 24 presets an interval and a calculation method to calculate the acceleration data. For example, the preset interval may be 2 minutes, and the preset calculation method may be used to calculate a sum or an average of the acceleration data acquired within the preset interval.

The setting module 24 further presets a threshold value to determine if the bicycle is decelerating. For example, if the preset calculation method calculates the average of the acceleration data, the threshold value may be preset as 1.5 m/s$^2$. The threshold value may be updated according to actual requirements. The preset information is stored in the storage system 12 of the brake warning device 1.

The calculation module 26 calculates a specific parameter according to the acceleration data acquired within the preset interval using the preset calculation method. For example, the calculation module 26 calculates an average or a sum of the acceleration data at every two minutes.

The determination module 28 determines if the specific parameter is less than the threshold value. If the specific parameter is less than the threshold value, the determination module 28 determines that the bicycle is decelerating. Otherwise, if the specific parameter is not less than the threshold value, the determination module 28 determines that the bicycle is not decelerating.

The determination module 28 sends a switch on command to the brake light 16 if the bicycle is decelerating. The brake light 16 is turned on to warn that the bicycle is braking according to the switch on command. In other embodiments, the determination module 28 may further send the switch on command to the speaker 18, to control the speaker 18 to output audio warning signals.

The determination module 28 also sends a switch off command to the brake light 16 if the bicycle is not decelerating and the brake light 16 is switched on. The brake light 16 is turned off according to the switch off command, to stop outputting any warning signals and save power of the power supply 13. In other embodiments, the determination module 28 may further send the switch off command to the speaker 18, to control the speaker 18 stop outputting the audio warning signals, if the bicycle is not decelerating and the speaker 18 is switched on.

In some embodiments, in order to reduce determination time, if the specific parameter is less than the threshold value, the determination module 28 may send the switch on command to the brake light 16 and/or the speaker 18 directly without determining if the brake light 16 and/or the speaker 18 have been turned on. Similarly, if the specific parameter is not less than the threshold value, the determination module 28 may send the switch off command to the brake light 16 and/or the speaker 18 directly without determining if the brake light 16 and/or the speaker 18 have been turned on. If the brake light 16 and/or the speaker 18 have been turned on, the brake light 16 and/or the speaker 18 are turned off according to the switch off command. If the brake light 16 and/or the speaker 18 have been turned off already, the brake light 16 and/or the speaker 18 may ignore the switch off command.

The identification module 29 may record positive peak values and negative peak values in the acceleration data, and calculate an estimated acceleration according to the positive peak values and negative peak values. For example, the estimated acceleration may be an average acceleration of the positive peak values and/or the negative peak values. The identification module 29 further may reset the threshold value according to the estimated acceleration. Because different bicyclists have different cycling rates, by utilizing the identification module 29, the threshold value may be adjusted according to user habits or requirements.

Figure 3A:
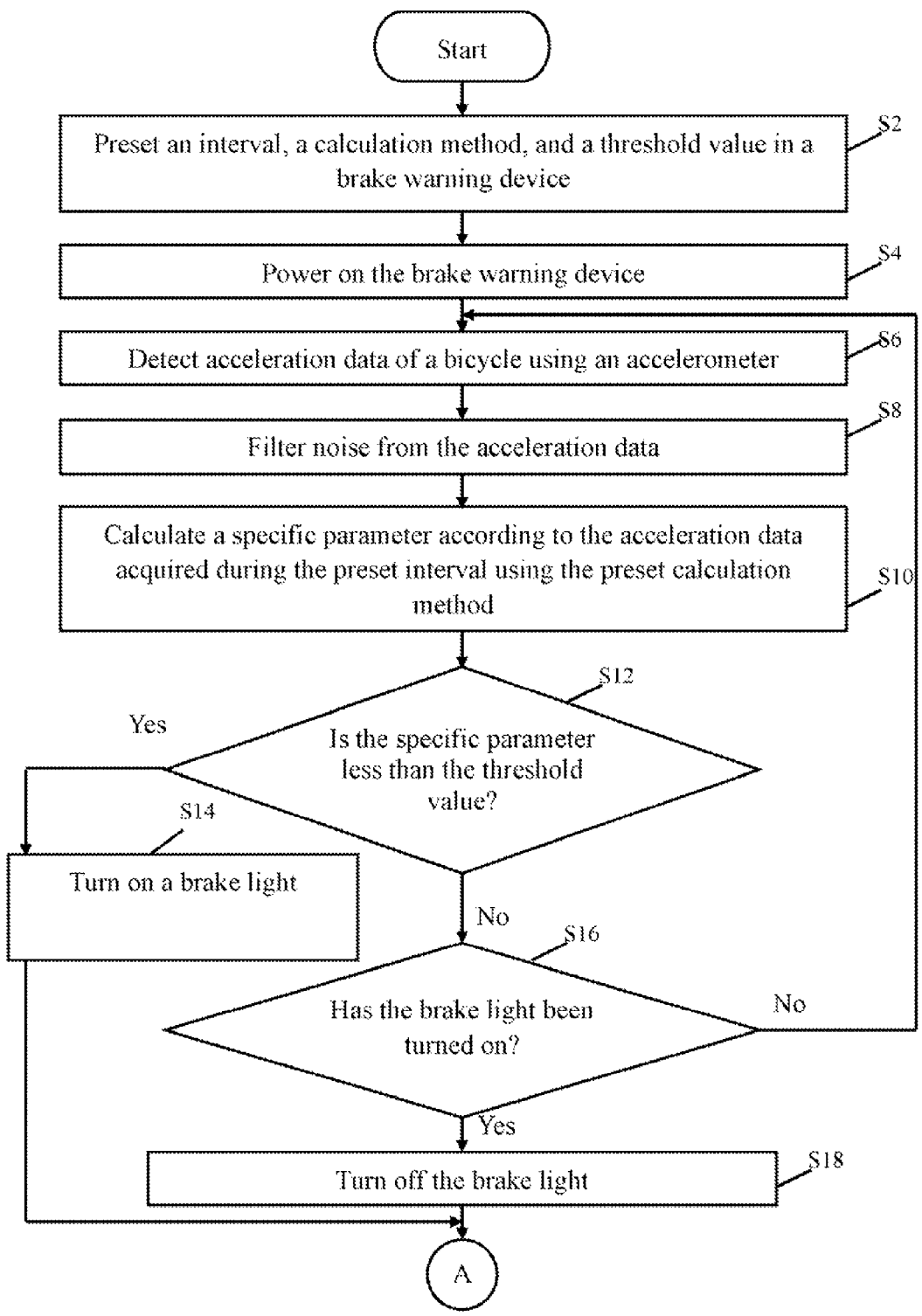
FIGS. 3A and 3B are flowcharts of one embodiment of a brake warning method.
Figure 3B:
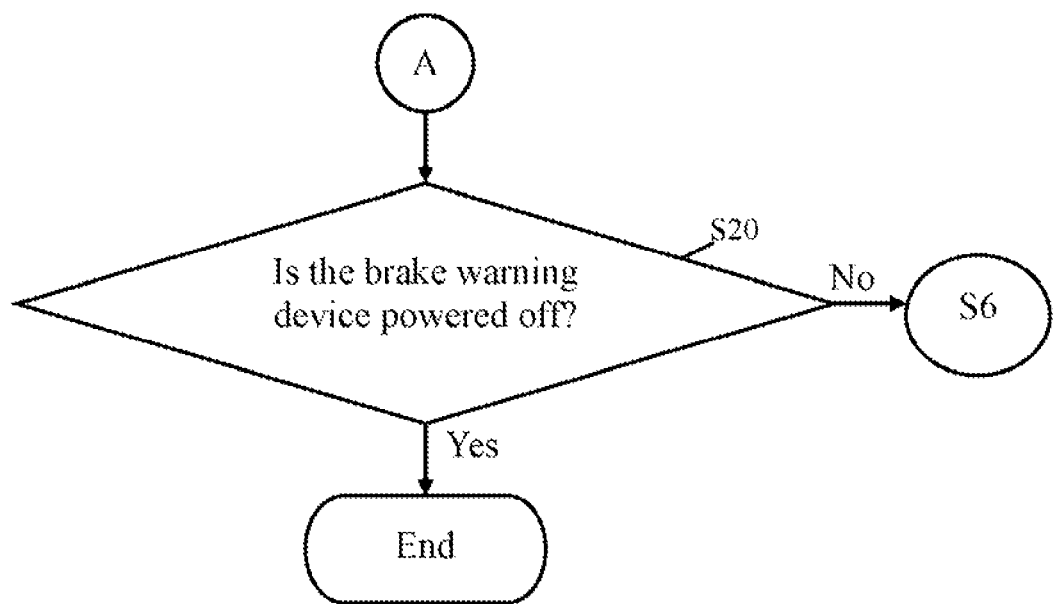

FIGS. 3A and 3B are flowcharts of one embodiment of a brake warning method using the brake warning device 1 of FIG. 1. Depending on the embodiment, additional blocks may be added, others removed, and the ordering of the blocks may be replaced.

In block S2, the setting module 24 presets an interval of the brake warning device 1 and a calculation method to calculate the acceleration data, and presets a threshold value to determine if the bicycle is decelerating. The preset information is stored in the storage system 12 of the brake warning device 1.

In block S4, the brake warning device 1 is powered on.

In block S6, the accelerometer 14 detects acceleration data of the bicycle.

In block S8, the filter module 22 filters noise from the acceleration data. As mentioned above, the noise may be white noise. By filtering the noise, the acceleration data may be more accurate.

In block S10, the calculation module 26 calculates a specific parameter according to the acceleration data acquired within the preset interval using the preset calculation method.

In block S12, the determination module 28 determines if the specific parameter is less than the threshold value.

If the specific parameter is less than the threshold value, the determination module 28 determines that the bicycle is decelerating, in block S14, the determination module 28 sends a switch on command to the brake light 16, to turn on the brake light 16 to warn that the bicycle is braking. Then the procedure goes to block S20 directly.

If the specific parameter is not less than the threshold value, in block S16, the determination module 28 further determines if the brake light 16 has been turned on.

If the brake light 16 has been turned on, in block S18, the determination module 28 sends a switch off command to the brake light 16, to turn off the brake light 16. If the brake light 16 has not been turned on, the procedure returns to block S6.

In block S20, the determination module 28 determines if the brake warning device 1 is powered off. If the brake warning device 1 is powered off, the procedure ends. If the brake warning device 1 is not powered off, the procedure returns to block S6.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A brake warning method using a brake warning device of a bicycle, the brake warning device comprising an accelerometer and a brake light, the method comprising:
   acquiring acceleration data of the bicycle using the accelerometer;
   calculating a specific parameter according to the acceleration data acquired within a preset interval using a preset calculation method;
   turning on the brake light to warn that the bicycle is braking when the specific parameter is less than a preset threshold;
   recording positive peak values and negative peak values in the acceleration data;
   calculating an estimated acceleration according to the positive peak values and negative peak values in the acceleration data; and
   resetting the threshold value according to the estimated acceleration.

2. The method according to claim 1, wherein the preset calculation method is used to calculate a sum or an average of the acceleration data acquired within the preset interval.

3. The method according to claim 1, further comprising:
   turning off the brake light when the specific parameter is not less than the preset threshold value and the brake light has been turned on.

4. The method according to claim 1, wherein the estimated acceleration is an average acceleration of the positive peak values and the negative peak values.

5. The method according to claim 1, further comprising:
filtering noise from the acceleration data, the noise having a preset frequency width or being within a predetermined frequency range.

6. A brake warning device, comprising:
an accelerometer that acquires acceleration data of a bicycle;
a brake light;
a storage system;
at least one processor; and
one or more programs stored in the storage system and being executable by the at least one processor, the one or more programs comprising:
a calculation module that calculates a specific parameter according to the acceleration data acquired within a preset interval using a preset calculation method;
a determination module that turns on the brake light to warn that the bicycle is braking when the specific parameter is less than a preset threshold; and
an identification module that records positive peak values and negative peak values in the acceleration data, calculates an estimated acceleration according to the positive peak values and negative peak values in the acceleration data, and resets the threshold value according to the estimated acceleration.

7. The brake warning device according to claim 6, wherein the preset calculation method is used to calculate a sum or an average of the acceleration data acquired within the preset interval.

8. The brake warning device according to claim 6, wherein the determination module further turns off the brake light when the specific parameter is not less than the preset threshold value and the brake light has been turned on.

9. The brake warning device according to claim 6, wherein the estimated acceleration is an average acceleration of the positive peak values and the negative peak values.

10. The brake warning device according to claim 6, wherein the one or more programs further comprise a filter module that filters noise from the acceleration data, the noise having a preset frequency width or being within a predetermined frequency range.

11. A non-transitory storage medium storing a set of instructions, the set of instructions capable of being executed by a processor to perform a brake warning method using a brake warning device of a bicycle, the brake warning device comprising an accelerometer and a brake light, the method comprising:
acquiring acceleration data of the bicycle using the accelerometer;
calculating a specific parameter according to the acceleration data acquired within a preset interval using a preset calculation method;
turning on the brake light to warn that the bicycle is braking when the specific parameter is less than a preset threshold;
recording positive peak values and negative peak values in the acceleration data;
calculating an estimated acceleration according to the positive peak values and negative peak values in the acceleration data; and
resetting the threshold value according to the estimated acceleration.

12. The non-transitory storage medium as claimed in claim 11, wherein the preset calculation method is used to calculate a sum or an average of the acceleration data acquired within the preset interval.

13. The non-transitory storage medium as claimed in claim 11, wherein the method further comprises:
turning off the brake light when the specific parameter is not less than the preset threshold value and the brake light has been turned on.

14. The non-transitory storage medium as claimed in claim 11, wherein the estimated acceleration is an average acceleration of the positive peak values and the negative peak values.

15. The non-transitory storage medium as claimed in claim 11, wherein the method further comprises:
filtering noise from the acceleration data, the noise having a preset frequency width or being within a predetermined frequency range.

\* \* \* \* \*